United States Patent
Hunt

(10) Patent No.: US 10,254,772 B2
(45) Date of Patent: Apr. 9, 2019

(54) BALANCED REGULATOR WITH TARGETED BOOST SENSING TUBE

(71) Applicant: EMERSON PROCESS MANAGEMENT REGULATOR TECHNOLOGIES, INC., McKinney, TX (US)

(72) Inventor: Christopher J. Hunt, Redondo Beach, CA (US)

(73) Assignee: EMERSON PROCESS MANAGEMENT REGULATOR TECHNOLOGIES, INC., McKinney, TX (US)

(*) Notice: Subject to any disclaimer, the term of this patent is extended or adjusted under 35 U.S.C. 154(b) by 177 days.

(21) Appl. No.: 15/291,775

(22) Filed: Oct. 12, 2016

(65) Prior Publication Data

US 2017/0102096 A1    Apr. 13, 2017

Related U.S. Application Data

(60) Provisional application No. 62/240,054, filed on Oct. 12, 2015.

(51) Int. Cl.
  *G05D 16/02* (2006.01)
  *F16K 39/02* (2006.01)
  (Continued)

(52) U.S. Cl.
  CPC .............. *G05D 16/02* (2013.01); *F16K 17/04* (2013.01); *F16K 39/022* (2013.01); *G05D 16/0658* (2013.01)

(58) Field of Classification Search
  CPC . Y10T 137/7801; F16K 17/04; F16K 39/022; G05D 16/02; G05D 16/0655
  (Continued)

(56) References Cited

U.S. PATENT DOCUMENTS 2,093,671 A * 9/1937 Giffen ................ G05D 16/0655
  137/505
2,554,634 A * 5/1951 Paine ...................... G01P 5/165
  403/34

(Continued)

FOREIGN PATENT DOCUMENTS

| DE | 2626714 A1 | 1/1977 |
| WO | WO-2004/088445 A1 | 10/2004 |
| WO | WO-2011/002559 A2 | 1/2011 |

OTHER PUBLICATIONS

Partial Search Report for International Application No. PCT/US2016/056492, dated Jan. 11, 2017.

(Continued)

*Primary Examiner* — William McCalister
(74) *Attorney, Agent, or Firm* — Marshall, Gerstein & Borun LLP

(57) ABSTRACT

A balanced port pressure regulator includes a valve body having a fluid inlet and a fluid outlet connected by a fluid passageway, an orifice being disposed between the fluid inlet and the fluid outlet. A valve seat is disposed within the fluid passageway. A valve plug is also disposed within the fluid passageway. A piston is disposed within the valve body, the piston separating the fluid passageway from a balancing chamber. A sleeve extends away from the piston, the sleeve forming a balancing passage that fluidly connects the fluid passageway with the balancing chamber. The sleeve includes an open end that terminates within the orifice. By terminating within the orifice, the open end of the sleeve generates boost only towards the end of a valve opening cycle when the valve plug approaches a fully open position, which is where boost is most needed.

8 Claims, 2 Drawing Sheets

(51) Int. Cl.
*F16K 17/04* (2006.01)
*G05D 16/06* (2006.01)

(58) Field of Classification Search
USPC ................................................ 137/505.18
See application file for complete search history.

(56) References Cited

U.S. PATENT DOCUMENTS

| | | | | |
|---|---|---|---|---|
| 2,564,686 A * | 8/1951 | Gray | ................... | F16K 39/022 137/625.26 |
| 2,599,577 A * | 6/1952 | Norgren | ............. | G05D 16/0663 137/484.8 |
| 2,663,122 A * | 12/1953 | Cornelius | .......... | G05D 16/0655 137/505.18 |
| 3,086,548 A * | 4/1963 | Galiger | .............. | G05D 16/0613 137/116.5 |
| 3,673,866 A * | 7/1972 | Alperovich | ......... | G01L 19/0007 73/182 |
| 3,692,047 A * | 9/1972 | Camp | .................. | F16K 31/145 137/495 |
| 3,902,522 A * | 9/1975 | Karenfeld | .......... | G05D 16/0658 137/484.6 |
| 4,037,594 A * | 7/1977 | Riegel | ..................... | B63C 11/06 128/201.27 |
| 5,285,810 A * | 2/1994 | Gotthelf | ........... | B60K 15/03006 137/340 |
| 6,079,434 A | 6/2000 | Reid et al. | | |
| 2014/0083530 A1 | 3/2014 | Fan | | |
| 2014/0090726 A1* | 4/2014 | Hawkins | ............ | G05D 16/0694 137/505.13 |
| 2014/0090727 A1 | 4/2014 | Nguyen et al. | | |
| 2015/0234395 A1 | 8/2015 | Fan et al. | | |
| 2015/0240969 A1* | 8/2015 | Lin | ....................... | F16K 39/022 251/282 |

OTHER PUBLICATIONS

Search Report for International application No. PCT/US2016/056492, dated Apr. 25, 2017.
Written Opinion for International application No. PCT/US2016/056492, dated Apr. 25, 2017.

* cited by examiner

BALANCED REGULATOR WITH TARGETED BOOST SENSING TUBE

FIELD OF THE DISCLOSURE

The disclosure generally relates to balanced port pressure regulators and more specifically to balanced port pressure regulators having a targeted boost sensing tube that senses pressure within the valve orifice.

BACKGROUND OF THE DISCLOSURE

Pressure regulating valves are used in myriad industrial and residential applications for controlling the downstream pressure of a fluid. For example, in chemical processing plants or oil refineries, pressure regulating valves are used to manipulate a flowing fluid to compensate for increases or decreases in demand, or other load disturbances, and thus keep the fluid pressure regulated. Similarly, pressure regulating valves may be used in plumbing fixtures to maintain a pre-determined pressure of fluid that automatically adjusts to variations in demand, such as anti-scald valves in showers or faucets. By controlling downstream pressure, pressure regulating valves compensate for variations in downstream demand. For example, as downstream demand increases, pressure regulating valves open to allow more fluid to flow through the pressure regulating valve, thus maintaining a relatively constant downstream pressure. On the other hand, as downstream demand decreases, pressure regulating valves close to reduce the amount of fluid flowing through the pressure regulating valve, again maintaining a relatively constant downstream pressure.

Pressure regulating valves can be categorized as either balanced or unbalanced. Unbalanced valves typically have high pressure inlet fluid on one side of the valve plug and lower pressure outlet fluid on the other side of the valve plug. Unbalanced valves suffer from an undesirable effect known as decaying inlet characteristic. The decaying inlet characteristic is a phenomenon in which an unbalanced valve experiences an unintended increase in downstream pressure as the upstream pressure decreases. This effect is undesirable as most pressure regulating valves attempt to maintain a constant downstream pressure. Decaying inlet characteristic is caused by fluid forces on the high pressure side of the valve plug attempting to move the valve plug to a closed position. As a result, the valve must have some mechanism to oppose this fluid force on the valve plug. Because the mechanism that opposes the fluid force typically has a set point, the force generated by such a mechanism is constant while the fluid force on the inlet side of the valve plug may vary (e.g., due to a decreasing supply of inlet fluid, or due to pressure variations upstream of the valve). Decaying inlet characteristic is particularly important to applications having a limited compressed fluid source, such as gas cylinders, tube trailers, or hydrils, because in such applications, there is a fixed supply of inlet fluid and thus, the inlet fluid pressure decreases as the inlet fluid supply decreases.

Unbalanced valves also suffer from damage that occurs to the valve seat. In unbalanced valves with high inlet pressures, the fluid pressure acting on large valve orifices can crush the valve seat. As a result, unbalanced valves are not ideal for high pressure, large orifice applications.

To address the decaying inlet characteristic in higher flow applications, balanced pressure regulators were developed. In the balanced pressure regulator, a portion of the upstream pressure is diverted to act on an unexposed portion of the valve plug or an unexposed portion of the valve plug moving mechanism. Thus, the valve plug is "balanced," by not having a net effect of fluid pressure act on the valve plug (or valve plug moving mechanism). In this way, the decaying inlet characteristic is eliminated (or greatly reduced) because the fluid forces acting on valve plug (or on the valve plug moving mechanism) cancel out, resulting in a net zero force attributed to the fluid pressure. In other words, the process fluid itself generates very little, or no opening/closing forces.

In diaphragm-type pressure regulators, higher pressure fluid from an upstream or inlet side of the valve may be vented to a chamber above the valve plug to balance forces on the valve plug, similar to the balanced regulators described above. Typically, this balancing of fluid forces is accomplished by incorporating one or more vent channels or ports that extend through the valve plug (or through channels formed in the valve stem or through a sleeve adjacent to the valve stem) from the inlet side to the chamber.

A typical diaphragm-type pressure regulator is illustrated in FIG. 1. The pressure regulator 10 includes a valve body 20 having a fluid inlet 24 and a fluid outlet 22 that are fluidly connected by a passage 26. The passage 26 includes a throat or orifice 28 (forming the narrowest part of the passage 26) in which a valve seat 30 is disposed. A bonnet 32 houses a load spring 34 that is connected to a valve stem 36. The valve stem 36 is operatively attached to a valve plug 38. The valve plug 38 interacts with the valve seat 30 to control fluid flow through the valve body 20 from the inlet 24 to the outlet 22.

A diaphragm 39 is connected to the bonnet 32 and to the valve plug 38. The diaphragm 39 separates the passage 26 from a cavity 40 in the bonnet 32 that contains the load spring 34. The diaphragm 39 is responsive to pressure differences between the passage 26 and the cavity 40.

A retainer 42 is attached to the valve stem 36 and retains the valve plug 38 on the valve stem 36. The retainer may include one or more fasteners 44, such as a nut, which are attached to the valve stem 36. One or more balancing passages or channels 46 fluidly connect the passage 26 with a chamber 48 located between the valve plug 38 and the cavity 40. Fluid forces on the valve plug 38 are balanced by fluid moving through the balancing channels 46.

One problem with diaphragm-type balanced regulators, such as the balanced regulator illustrated in FIG. 1 is that they suffer from droop, or a decrease in setpoint with increased flow.

SUMMARY

In accordance an exemplary aspect, a balanced port pressure regulator comprises a valve body having a fluid inlet and a fluid outlet connected by a fluid passageway, an orifice being disposed between the fluid inlet and the fluid outlet, the orifice being the most restrictive portion of the fluid passageway, and a valve seat disposed within the fluid passageway. A valve plug is attached to a movable valve stem, the valve plug and the valve stem being disposed within the fluid passageway, the valve plug interacting with the valve seat to selectively open or close the fluid passageway. A diaphragm retainer is disposed within the valve body, the diaphragm retainer separating the fluid passageway from a balancing chamber, and a sleeve extends away from the diaphragm retainer, the sleeve circumferentially surrounding the valve stem with a space being formed between the sleeve and the valve stem, the space forming a balancing passage that fluidly connects the fluid passageway with the balancing chamber. The sleeve includes an opening that is located within the orifice.

In accordance with another exemplary aspect, a balanced plug assembly comprises a valve seat having a first opening and a second opening, a valve plug disposed on the end of a movable valve stem, with the valve plug and the valve stem being movable relative to the valve seat, and with the valve plug interacting with the valve seat to selectively open or close the second opening. A diaphragm retainer is located between the valve plug and a balance chamber, and a sleeve extends away from the diaphragm retainer, the sleeve circumferentially surrounding the valve stem. The sleeve has an opening distal to the diaphragm retainer, with a space being formed between the sleeve and the valve stem, the space forming a balancing passage. The opening of the sleeve is located between the first opening and the second opening of the valve seat.

The foregoing aspects may be combined with any one or more of the following preferred forms as well with other aspects and/or additional aspects, arrangements, features, and/or technical effects that are apparent upon detailed inspection of the Figures and the following description.

In a preferred form, the valve seat includes a first opening and a second opening, the first opening and the second opening defining the orifice. The opening of the sleeve may be located between the first opening and the second opening of the valve seat. The opening of the sleeve may be located 25% or more of distance between the first opening and the second opening of the valve seat away from a seating surface on the valve seat.

In another preferred form, the opening of the sleeve includes a chamfered surface.

In another preferred form, the opening includes a plurality of openings distributed circumferentially about the sleeve, the plurality of openings being located between the first opening and the second opening of the valve seat.

In another preferred form, a diaphragm is disposed between the diaphragm retainer and valve body, with the balancing chamber being located between the diaphragm retainer and the diaphragm.

In another preferred form, the valve stem and the valve plug are movable relative to the sleeve.

In another preferred form, a load spring is operatively connected to the valve stem.

In another preferred form, the opening of the sleeve comprises an open end of the sleeve.

In another preferred form 11, the first opening and a second opening of the valve seat define an orifice of a valve body, and the opening of the sleeve may be located 25% or more of distance between the first opening and the second opening of the valve seat away from a seating surface on the valve seat.

In another preferred form, the opening of the sleeve includes a plurality of openings distributed circumferentially about the sleeve, the plurality of openings being located between the first opening and the second opening of the valve seat.

Figure 1:
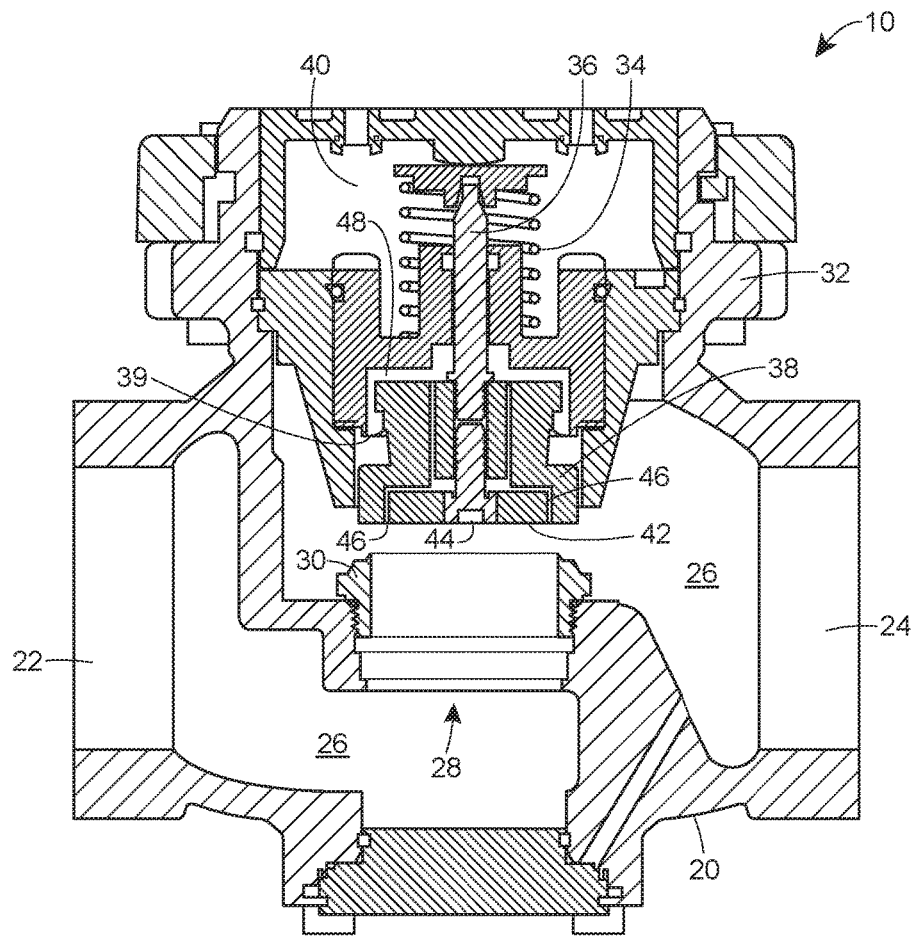
FIG. 1 is a cross-sectional view of a prior art balanced regulator.

While the disclosure is susceptible to various modifications and alternative constructions, certain illustrative embodiments thereof have been shown in the drawings and will be described below in detail. It should be understood, however, that there is no intention to limit the disclosure to the specific forms disclosed, but on the contrary, the intention is to cover all modifications, alternative constructions, and equivalents falling within the spirit and scope of the invention.

DETAILED DESCRIPTION

Figure 2:
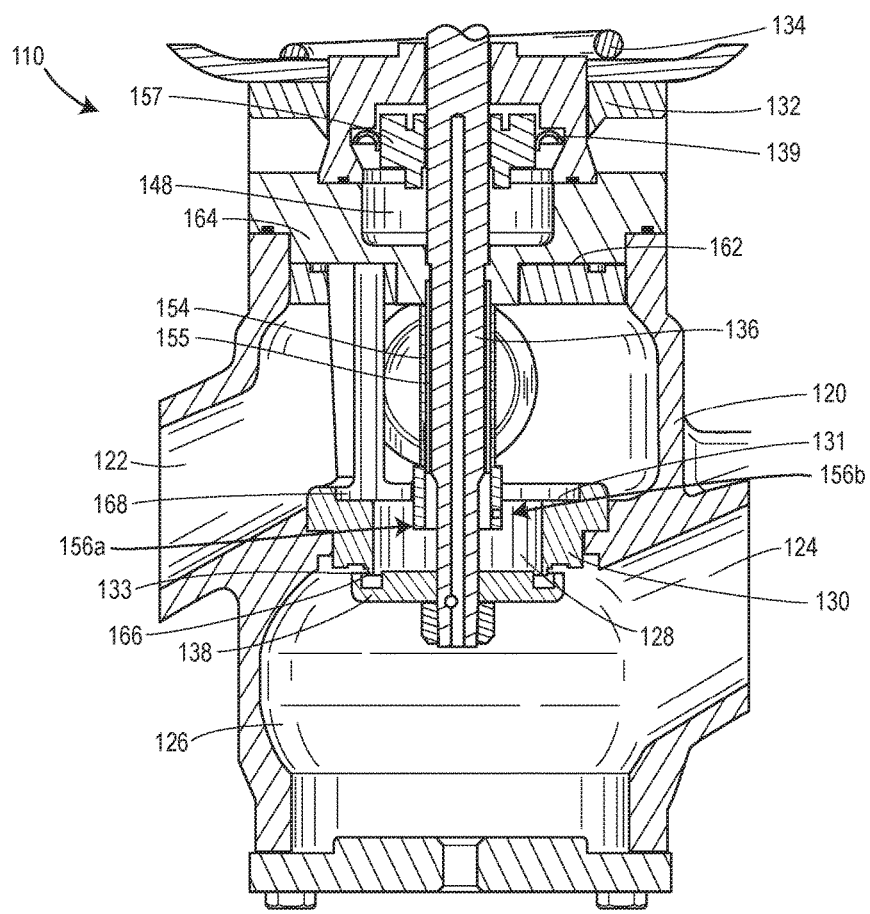
FIG. 2 is a cross-sectional view of a balanced port regulator constructed in accordance with the teachings of the disclosure.

Referring now to the drawings and with specific reference to FIG. 2, a balanced port pressure regulator is generally referred to by reference numeral 110. Where the balanced port pressure regulator of FIG. 2 includes elements that correspond to the elements of the balanced pressure regulator of FIG. 1, those elements will be numbered similarly, the only difference being that the reference numerals of FIG. 2 being increased by a multiple of 100. For example, corresponding elements of FIG. 2 will be numbered exactly 100 greater than the corresponding elements illustrated in FIG. 1.

Turning now to FIG. 2, the balanced port pressure regulator 110 includes a valve body 120 having a fluid inlet 122 and a fluid outlet 124 connected by a fluid passageway 126. The fluid passageway 126 includes a throat or orifice 128 (i.e., the narrowest part of the passageway 126) leading from the fluid inlet 122 to the fluid outlet 124, and a valve seat 130 disposed in the orifice 128. In the embodiment of FIG. 2, the valve seat 130 forms the orifice 128, which is the narrowest part of the fluid passageway 126 in the valve body 120. The valve seat 130 includes an upstream or first opening 131 and a downstream of second opening 133. An internal length of the valve seat 130 being defined as the distance between the first opening 131 and the second opening 133.

A bonnet 132 houses a load spring 134 that is connected to a valve stem 136. The valve stem 136 is operatively attached to a valve plug 138. The valve plug 138 interacts with the valve seat 130 to control fluid flow through the valve body 120 from the inlet 122 to the outlet 124. In the embodiment of FIG. 2, the valve plug 138 is located downstream of the valve seat 130. More specifically, the valve plug 138 is located downstream of the second opening 133 of the valve seat 130.

A sleeve 154 surrounds the valve stem 136. A space is formed between the sleeve 154 and the valve stem 136, the space forming one or more balancing channels 155, through which process fluid is allowed to flow to a balancing chamber 148. The sleeve 154 has an opening that terminates in the orifice 128. In the embodiment illustrated in FIG. 2, the opening may alternatively be an open end 156a or a plurality of openings 156b that are circumferentially disposed about the sleeve 154.

A diaphragm 139 is connected to the valve stem 136 by a diaphragm plate 157. The diaphragm 139 separates the balancing chamber 148 from a cavity in the bonnet 132 that contains the load spring 134, which is operatively attached to the valve stem 136 to provide a bias to the valve stem 136. The diaphragm 139 is responsive to pressure differences between the balancing chamber 148 and the cavity.

Fluid forces on the valve plug 138 are balanced by fluid moving through the balancing channels 146 from higher pressure regions to lower pressure regions.

The sleeve 154 extends outward, away from a bottom 162 of a diaphragm retainer 164. The diaphragm retainer 164 separates the passageway 126 from the balancing chamber 148. The balancing channel 155 fluidly connects the passageway 126 in the orifice 128 to the balancing chamber 148. The sleeve 154 extends away from the bottom 162 of the diaphragm retainer 164 to place the opening 156a, 156b upstream of a seating surface 166 (that is contacted by the valve plug 138 to prevent fluid flow through the valve body 120 when the valve plug 138 is in a closed position), but downstream of the upstream most portion 168 of the orifice 128. In the embodiment of FIG. 2, the opening 156a, 156b is located between the first opening 131 and the second opening 133 of the valve seat 130. The valve stem 136 and the valve plug 138 are movable relative to the sleeve 154.

In some embodiments, the valve seat 13, the valve stem, 136, the valve plug 138, the sleeve 154, and the diaphragm retainer 164 may be formed as a balanced plug assembly.

In other embodiments, the open end 156a may include a chamfered opening surface, or a surface that otherwise directs the opening away from the direction of fluid flow from the inlet 122, as illustrated in FIG. 2. In yet other embodiments, the plurality of openings 156b may be distributed circumferentially around the sleeve 154. In such embodiments, the openings may be generally rectangular in shape. In other embodiments, the openings may take on virtually any other shape, such as circle, oval, square, triangle, slot, irregular, or any other shape. Particular shapes may be selected to aid in directing local fluid flow into the openings at different locations within the sleeve 154. In yet other embodiments, the sleeve 154 may include a combination of openings, chamfered openings, and circumferentially disposed openings.

When the valve plug 138 is in a closed position, contacting the seating surface 166, the open end 156a is generally located between the upstream most portion 168 of the orifice 128 and the seating surface 166. In other words, when the valve plug 138 is in the closed position, the open end 156a is located between the first opening 131 and the second opening 133 in the valve seat 130, in the embodiment illustrated in FIG. 2.

In certain desirable embodiments, the open end 156a is located upstream of the seating surface 166 by 25% or more of the length of the orifice 128 as measured from the upstream most portion 168 to the seating surface 166. In the embodiment of FIG. 2, the open end 156a is located upstream of the seating surface 166 by 25% or more of the length of the valve seat 130.

By locating the open end 156a upstream of the seating surface 166, but within the orifice 128, the open end 156a avoids the initial area of highest flow velocity between the valve plug 138 and the seating surface 166 when the valve plug 138 initially begins to open. This highest flow velocity area is sometimes referred to as the "curtain area." Because the average flow velocity in the curtain area is the highest, static pressure in this region is lowest in the passageway 126. The curtain area remains the area of highest flow velocity until the valve plug 138 opens sufficiently to make the curtain area larger than the orifice area. At this point, the orifice itself becomes the primary flow restriction and the flow velocity in the orifice becomes the highest flow velocity in the passageway 126. Because the open end 156a is located within the orifice 128, but not in the curtain area, the pressure transmitted through the sleeve 154 to the balance chamber 148 is also reduced, resulting in a substantial boost to the valve as the valve plug 138 approaches a fully open position, which is where prior art valves experience droop. This boost near the fully open position counteracts the droop, resulting in more constant outlet pressures as the valve plug 138 approaches the fully open position.

Any of the embodiments of balanced port pressure regulators or balanced plug assemblies disclosed herein may be used to advantageously combat regulator pressure droop at a point in the opening cycle where boost is needed most, near the fully open position of the valve plug because the orifice does not become the most restrictive point in the flow passageway until the valve plug nears a fully open position.

Although certain balanced port regulators and balanced plug assemblies have been described herein in accordance with the teachings of the present disclosure, the scope of coverage of this patent is not limited thereto. On the contrary, while the invention has been shown and described in connection with various preferred embodiments, it is apparent that certain changes and modifications, in addition to those mentioned above, may be made. This patent covers all embodiments of the teachings of the disclosure that fairly fall within the scope of permissible equivalents. Accordingly, it is the intention to protect all variations and modifications that may occur to one of ordinary skill in the art.

What is claimed is:

1. A balanced port pressure regulator, comprising:
  a valve body having a fluid inlet and a fluid outlet connected by a fluid passageway;
  a valve seat disposed within the fluid passageway, wherein the valve seat comprises an upstream opening and a downstream opening that define an orifice;
  a valve plug attached to a movable valve stem, the valve plug and the valve stem being disposed within the fluid passageway, the valve plug interacting with the valve seat to selectively open or close the fluid passageway;
  a diaphragm retainer disposed within the valve body, the diaphragm retainer separating the fluid passageway from a balancing chamber;
  a sleeve extending away from the diaphragm retainer and circumferentially surrounding the valve stem, a space being formed between the sleeve and the valve stem, wherein a plurality of openings that are distributed circumferentially about the sleeve fluidly connects the fluid passageway with the balancing chamber via the space;
  wherein the plurality of openings is located within the orifice at a position that is upstream of the downstream opening by 25% or more of a distance between the upstream and downstream openings.

2. The balanced port pressure regulator of claim 1, further comprising a diaphragm disposed between the diaphragm retainer and valve body, the balancing chamber being located between the diaphragm retainer and the diaphragm.

3. The balanced port pressure regulator of claim 1, wherein the valve stem and the valve plug are movable relative to the sleeve.

4. The balanced port pressure regulator of claim 1, further comprising a load spring operatively connected to the valve stem.

5. A balanced plug assembly, comprising:
  a valve seat having a first opening and a second opening that define an orifice;
  a valve plug disposed on the end of a movable valve stem, the valve plug and the valve stem being movable relative to the valve seat, the valve plug interacting with the valve seat to selectively open or close the second opening;
  a diaphragm retainer, the diaphragm retainer being located between the valve plug and a balance chamber; and
  a sleeve extending away from the diaphragm retainer and circumferentially surrounding the valve stem, a space being formed between the sleeve and the valve stem, wherein a plurality of openings that are distributed circumferentially about the sleeve fluidly connect the fluid passageway with the balancing chamber via the space;

wherein the plurality of openings is located between the first opening and the second opening of the valve seat at a position that is upstream of the second opening by 25% or more of a distance between the first and second openings.

6. The balanced plug assembly of claim 5, wherein an open end of the sleeve includes a chamfered surface.

7. The balanced plug assembly of claim 5, wherein the valve stem and the valve plug are movable relative to the sleeve.

8. The balanced plug assembly of claim 5, further comprising a load spring operatively connected to the valve stem.

\* \* \* \* \*